US005541645A

United States Patent [19]
Davis

[11] Patent Number: 5,541,645
[45] Date of Patent: Jul. 30, 1996

[54] METHOD AND APPARATUS FOR DYNAMICALLY DETERMINING AND SETTING CHARGE TRANSFER AND COLOR CHANNEL EXPOSURE TIMES FOR A MULTIPLE COLOR, CCD SENSOR OF A FILM SCANNER

[75] Inventor: Michael H. Davis, Marion, N.Y.

[73] Assignee: Eastman Kodak Company, Rochester, N.Y.

[21] Appl. No.: 282,182

[22] Filed: Jul. 28, 1994

[51] Int. Cl.[6] .................. H04N 1/48; H04N 1/56
[52] U.S. Cl. ........................... 348/96; 358/504
[58] Field of Search .................. 348/96; 358/504; H04N 1/48, 1/56

[56]                References Cited
            U.S. PATENT DOCUMENTS

| 3,931,463 | 1/1976  | Levine .          |
| 3,944,816 | 3/1976  | Harada .          |
| 4,205,337 | 5/1980  | Millward .        |
| 4,363,034 | 12/1982 | Grancoin et al. . |
| 4,382,267 | 5/1983  | Angle .           |
| 4,471,228 | 9/1984  | Nishizawa et al. .|
| 4,553,168 | 11/1985 | Chautemps et al. .|
| 4,589,024 | 5/1986  | Koch et al. .     |
| 4,597,014 | 6/1986  | Suzuki .          |
| 4,651,215 | 3/1987  | Bell et al. .     |
| 4,701,626 | 10/1987 | Ishizaki et al. . |
| 4,706,123 | 11/1987 | Chautemps .       |
| 4,809,073 | 2/1989  | Chiba et al. .    |
| 4,890,166 | 12/1989 | Kimura et al. .   |
| 4,912,496 | 3/1990  | Tamada et al. .   |
| 4,974,068 | 11/1990 | Hiramatsu et al. ...... 358/504 |
| 4,980,776 | 12/1990 | Aosaki et al. .   |
| 4,984,002 | 1/1991  | Kokubo .          |
| 5,040,070 | 8/1991  | Higashitsutsumi et al. . |
| 5,157,052 | 10/1992 | Levine et al. .   |
| 5,182,658 | 1/1993  | Ishizaki et al. . |
| 5,233,428 | 8/1993  | Alford et al. .   |
| 5,247,367 | 9/1993  | Lee .             |
| 5,258,845 | 11/1993 | Kyuma et al. .    |
| 5,264,940 | 11/1993 | Komiya et al. .   |
| 5,303,052 | 4/1994  | Narabu et al. .   |

OTHER PUBLICATIONS

"Kodak Professional PCD Film Scanner 4045", Michael H. Davis, *SPIE*, vol. 1901, Cameras, Scanners, and Image Acquisition System (1993)/161.

*Primary Examiner*—Howard W. Britton
*Attorney, Agent, or Firm*—Edward Dugas

[57]                ABSTRACT

A system that determines the integration time periods for the channels of a color scanner. The slowest channel or longest time period is used to set a line scan clock period or transfer clock period of the scanner. The exposure start times for the other channels, which are charged faster than the slowest channel, are set relative to the transfer clock. The transfer clock and exposure start time of all channels is adjusted if necessary for the density of the film being scanned.

8 Claims, 7 Drawing Sheets

METHOD AND APPARATUS FOR DYNAMICALLY DETERMINING AND SETTING CHARGE TRANSFER AND COLOR CHANNEL EXPOSURE TIMES FOR A MULTIPLE COLOR, CCD SENSOR OF A FILM SCANNER

BACKGROUND OF THE INVENTION

1. Field of the Invention

The present invention is directed to a system for dynamically setting the line scan time or charge transfer clock timing and the color channel integration time for a multiple color channel charge coupled device (CCD) sensor in a scanner and, more particularly, to a system that dynamically determines the integration or exposure time for the channel that requires the longest required exposure time, sets the charge transfer clock, which governs sensor line scan time, responsive to the required exposure time, sets the delay or dead time of the more sensitive channels relative to the transfer clock and adjusts the exposure time for film density.

2. Description of the Related Art

The specific function of a film scanner 10, such as represented schematically in FIG. 1, is to measure optical density for a plurality of colors at many points on film 12 being scanned. The density of each pixel, or smallest region of the film 12 that is sensed, is measured by illuminating the region with light of a known light intensity and measuring the amount of light which is transmitted through the film 12 over a specific spectral range. The film scanner 10 typically includes illumination optics 14 which projects light through the film 12, a lens 16 which focuses the transmitted light through spectral separation filters and onto an optical detector 18 and measuring electronics 20 which determines the amount of light that is sensed by the detector 18. The illumination optics 14, as illustrated in FIG. 2, include an illumination source (or lamp) 21, bandpass and balance filters 22 to condition the broad spectral characteristics of the light from the lamp 21 and an optomechanical device (integrator 24 with condensing optics 26) which spatially conditions the light to irradiate a region of the film which includes the pixels being measured with a stable, intense beam of light. The lens 16 (FIG. 1) collects the light which is transmitted by the film 12 and transports it through the spectral separation filters to the detector 18. The optical detector 18 converts light to an analog electrical signal and the measuring electronics 20 is responsible for measuring this electrical signal at the proper time, converting it to a density measurement, correcting it for instrument errors and translating it into a digital form suitable for transmission to a computer or other device. The detector of a three color scanner includes three linear arrays of sensors that are scanned across film to convert the film image into a digital image.

Film scanners are imperfect instruments which must be periodically calibrated. The calibration of a film scanner may be performed either with no film present or with film of a known density mounted in the film holding frame of the scanner. The amount of light which reaches the optical detector 18 is not only a function of the calibration film, it also will vary due to manufacturing tolerances and aging effects in the optical components of the film scanner. Also, multi-format film scanners may operate at a plurality of optical conjugates, resulting in variations in system magnifications which result in wide variations in the amount of light which is collected by the lens 16 and transmitted to the optical detector 18.

The radiometric calibration process of a film scanner consists of determining the amplitude of the analog signal (under controlled conditions) and adjusting some parameter(s) which will amplify or attenuate the signal amplitude. This process is repeated iteratively until the desired signal level is achieved. To date, several on chip exposure control methods for CCD imagers have been discussed and which control the amplitude of the output signal either by discarding unwanted charge accumulated over a percentage of the integration period (U.S. Pat. Nos. 5,105,264 and 5,233,428) or by modifying the bias voltages applied to the device electrodes (U.S. Pat. No. 4,553,168). Other schemes have been devised and discussed by which the incident light is attenuated by an electronically controlled shutter which is external to the CCD (U.S. Pat. No. 5,247,367).

A common goal of all film scanners is to achieve as high a quality digital image as is possible in the shortest amount of time. A film scanner which is capable of digitizing a wide range of film formats must be capable of a wide range of optical conjugates (or system magnifications). The system radiometric requirements for any given magnification may be calculated relative to the known systems radiometric requirements at some reference magnification, however, scanner to scanner variations and variations in a given scanner over time require that the system be recalibrated at this reference magnification quite often. It is desirable to have a method which can optimize the radiometric performance of such a scanner for any possible setup condition or state. Use of traditional exposure control methods in a multiple format film scanner is inefficient for this purpose. For example, a film scanner which utilizes the same illuminator for each film format must adjust the integration time by a factor of 4 when going from a magnification of 0.5 to 2.0. If on chip electronic exposure control or a mechanical iris or shutter is used to compensate for this difference, the magnification 0.5 setup would scan at a speed which is four times slower than the optimal speed. Also, when the above mentioned techniques, which "throw away light" are used, the system not only suffers from inefficient scan times, but also lower quality of the resulting digital image because undesirable integration time dependent artifacts in the optical detector are enhanced and/or the lens is operated at a less than the optimal f-stop.

What is needed is a system which will dynamically calibrate a scanner to optimize the line scan speed for any set up condition of the scanner.

SUMMARY OF THE INVENTION

It is an object of the present invention to minimize the time required to scan a line of pixels when line scanning film and to thus minimize the time required to scan the film.

It is another object of the present invention to adjust the integration or exposure time of each channel of a color film scanner to minimize the line scan time.

It is also an object of the present invention to adjust the exposure time of the color channels to account for the density of the film being scanned.

It is an additional object of the present invention to provide a method for operating a photosensitive charge transfer device in a manner which provides the most efficient scan time and maximizes the image quality by modifying the clocks used to control the device.

It is a further object of the present invention to provide a method for determining the optimal values for the clocks used to control the device.

It is another object of the present invention to provide a method for adjusting the device clocks for optimum exposure to obtain the range of densities which are of interest on the film.

The above objects can be attained by a system that determines the integration time for the slowest color channel of a multiple color film scanner during calibration of the color sensor or channel. This minimum exposure time is used to set the charge transfer clock or line scan period. The exposure or integration times for the other channels, which are charged faster than the slowest channel, are set relative to the transfer clock. The exposure time of all channels can then be adjusted for the density of the film being scanned if a sample of the film is not used during the calibration.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
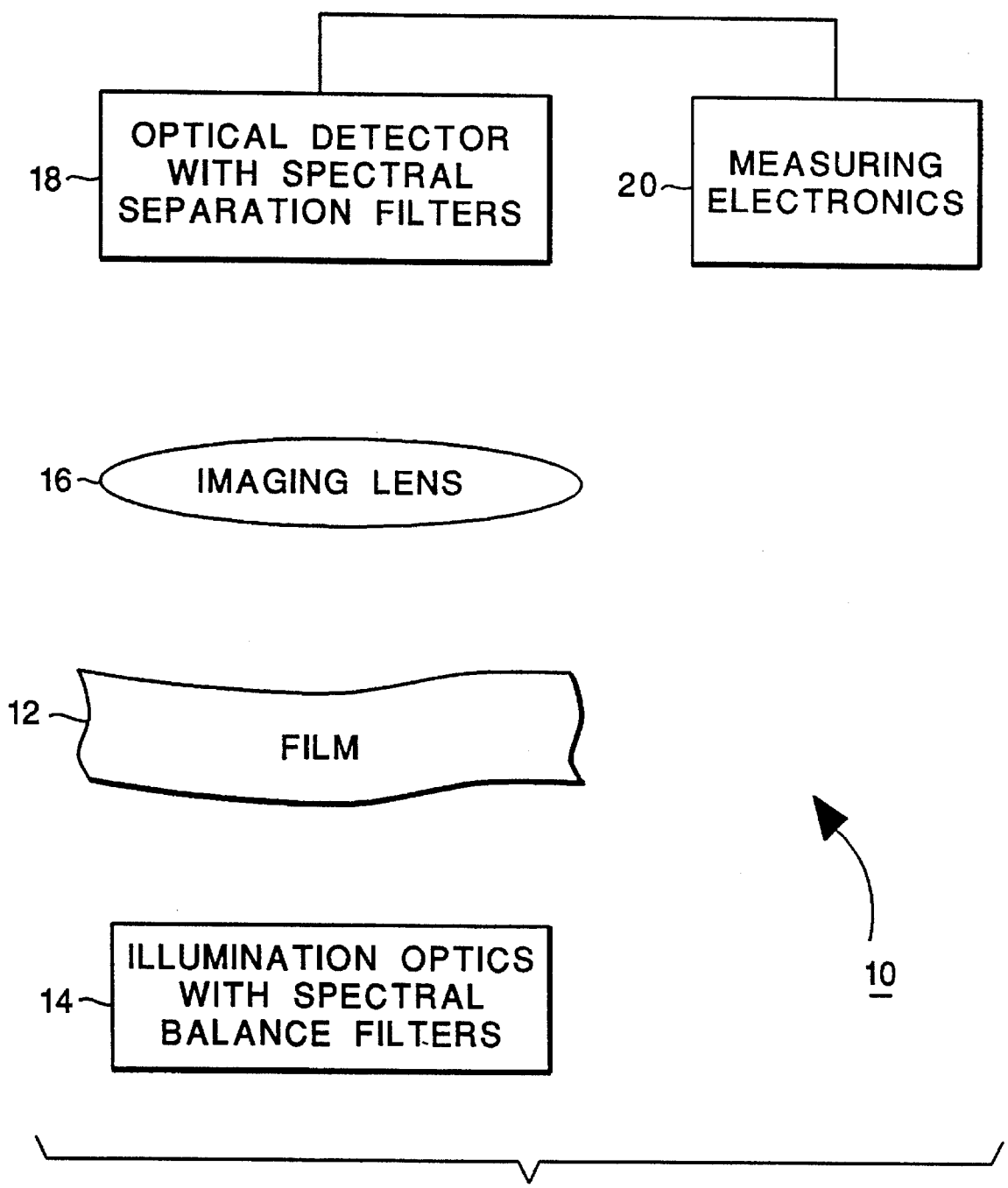
FIG. 1 depicts components of a film scanner.
Figure 2:
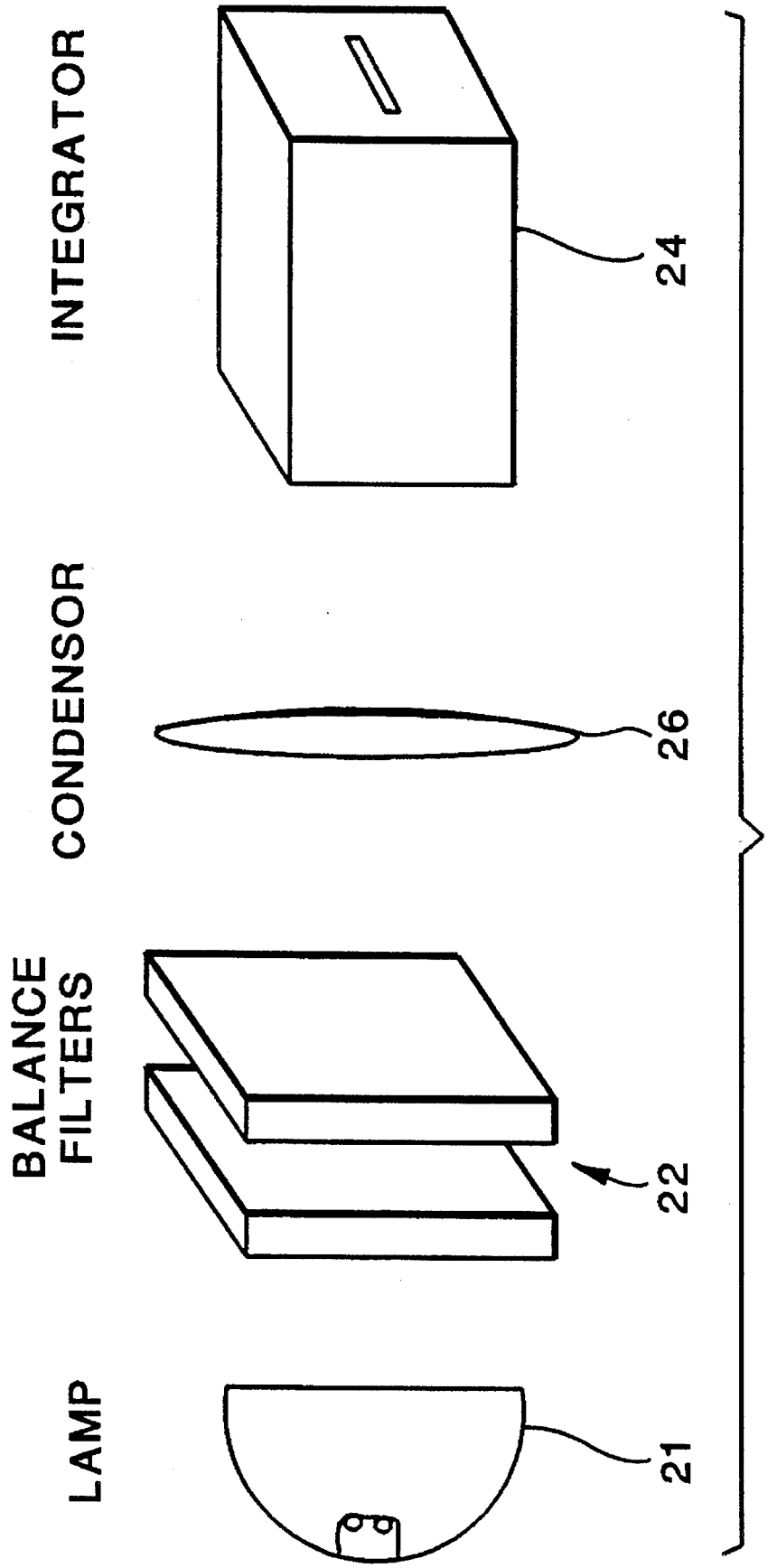
FIG. 2 illustrates illumination optics in greater detail.
Figure 3:
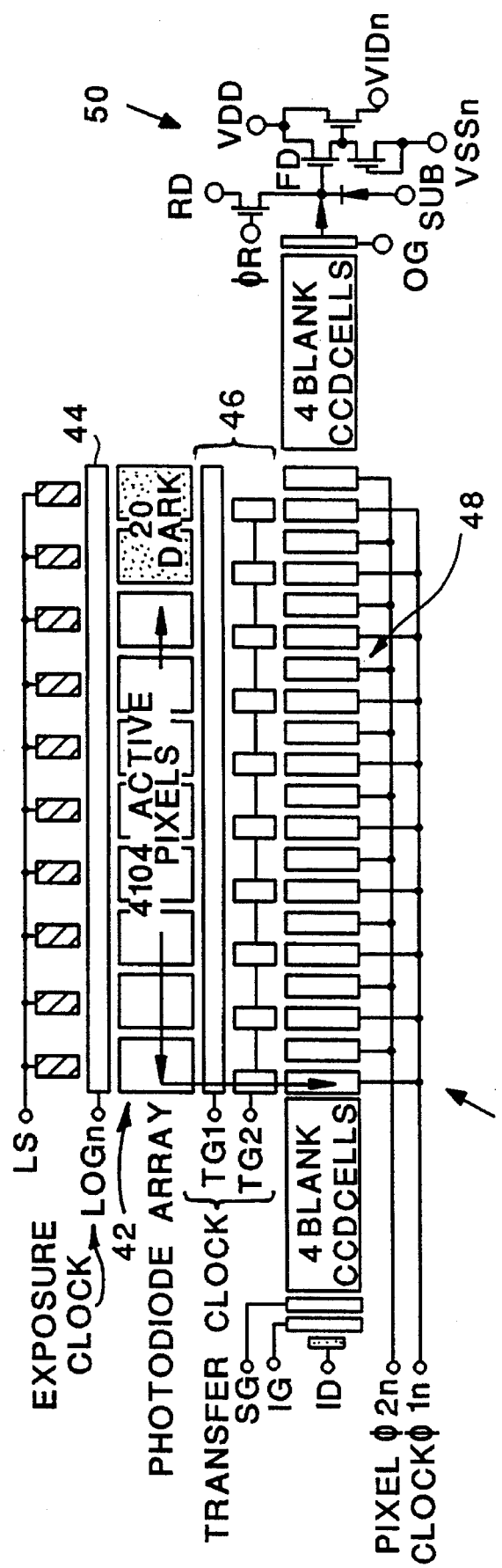
FIG. 3 illustrates one of the CCD array channels of a three color film scanner.

A film scanner can exhibit a variety of radiometric states which are dependent upon variable setup conditions (system magnification, lens f-stop, lamp brightness, size of the film being scanned, etc.), normal manufacturing variations in optical components or variations in the optical components due to aging. The present invention is a method and apparatus for dynamically determining the optimum clock parameters (frequency and total number) to minimize line scan time, maximize film scan speed and maximize image quality for the dynamic radiometric conditions possible for any particular film scanner. The present invention is designed to operate with a charge coupled device (CCD) sensor 40 illustrated in FIG. 3, such as found in the Kodak KLI-4103C Tri-linear CCD Imager available from Eastman Kodak Co. FIG. 3 illustrates one of the channels in this CCD Imager. A three color film scanner, such as the Kodak Professional PCD 4045 Film Scanner also available from Kodak, utilizes this Tri-linear imager to obtain the three color channels. This sensor 40 starts operation by clearing any residual charge from the active pixels of a photodiode array 42 by activating a charge transfer gate 44. After an integration period during which photons cause charge to accumulate in the active pixels of the array 42, the accumulated charge is transferred through charge transfer gates 46 to a shift register 48. The charges in the shift register 48 are shifted out to an amplifier 50 and then converted into 12 bit digital values by a digital-to-analog (D/A) converter (not shown). While the charge is being shifted out of shift register 48 the active pixels of the array 42 are accumulating the charge of the next line scanned.

This sensor 40 includes several different clock signals or clock periods which are of interest with respect to the present invention. A pixel clock, with two phases, controls the transfer or shifting of the charge samples of the pixels along or through the shift register 48 of the sensor 40. The transfer of the charges from the active pixels of the photodiode array 44 to the shift register 48 is controlled by a transfer clock, also having two phases, which controls the charge transfer gates 46. The transfer clock is a cyclic, short duty cycle clock which occurs once per image or scan line and is triggered by the number of pixel clocks which have occurred since the last transfer clock. The restrictions on pixel clock are that its cyclic frequency must be within the operating range of the solid state device, that is, not so fast that the charge cannot be transferred between stages and not so slow that excessive noise loses occur, and there must be at least enough pixel clocks between two successive transfer clocks to "clear" the CCD shift register 48 of all charge transferred into the CCD shift register 48 from the previous transfer clock. The transfer clock must also take into account any overhead associated with the shift out of the shift register 48, such as dark pixels, blank CCD cells and stages of the output amplifier 50.

The transfer clock period for each of the three color channels is governed by: the required integration time, or the time that the active pixels reach some conventional fixed percentage of saturation, also sometimes called "full-well", or the time to reach a fixed percentage of the top of the range of the D/A converter; and the number of pixels that need to be transferred through the shift register 48 to the output signal amplifier 50. In a first case when the minimum time required for shifting the charges through the shift register 48 is longer than the integration time, the transfer clock period must be at least as long as the time required to complete the shift and clear all charge out of the shift register 48. In a second case when the integration time is longer than the charge shift time, the transfer clock must be at least as long as the integration time. In the past the transfer clock time period has been fixed to a period which is greater than the integration time for the slowest channel of all the scanners produced as one or more models by a scanner manufacturer. The present invention is designed to determine the minimum transfer clock period and the exposure clock periods in the second case and to determine the exposure clock periods in the first case.

Typically because the amount of light provided to the three color channels of a three color scanner is different, each color channel has a different integration time. When the three color channels of the scanner are considered, the transfer clock time period must be at least equal to the longest integration time for the three color channels. Because the required integration times for the three channels are different the integration time for the faster sensors must be adjusted relative to the transfer clock period or the faster sensors will be saturated during normal operating conditions. The adjustment is performed by adjusting the time at which the active pixels of the array 42 are drained of charge and begin to accumulate charge of the color signal. The charge is drained from the array 42 through the transfer gate 44 controlled by what is called an exposure or exposure start clock. The exposure clock includes two periods: a dead time period which is the time during which charge is not accumulated, and an integration period which generally follows the dead period and which is the time during which charge is accumulated. The integration time clock period is a clock period which is delayed with respect to the transfer clock for the color channels that have the shorter integration time periods. That is, for the slowest color channel, according to the present invention, the start of the integration period is coincident with the transfer clock used for all sensors and for the faster color channels the integration period is delayed relative to the transfer clock.

Figure 4A:
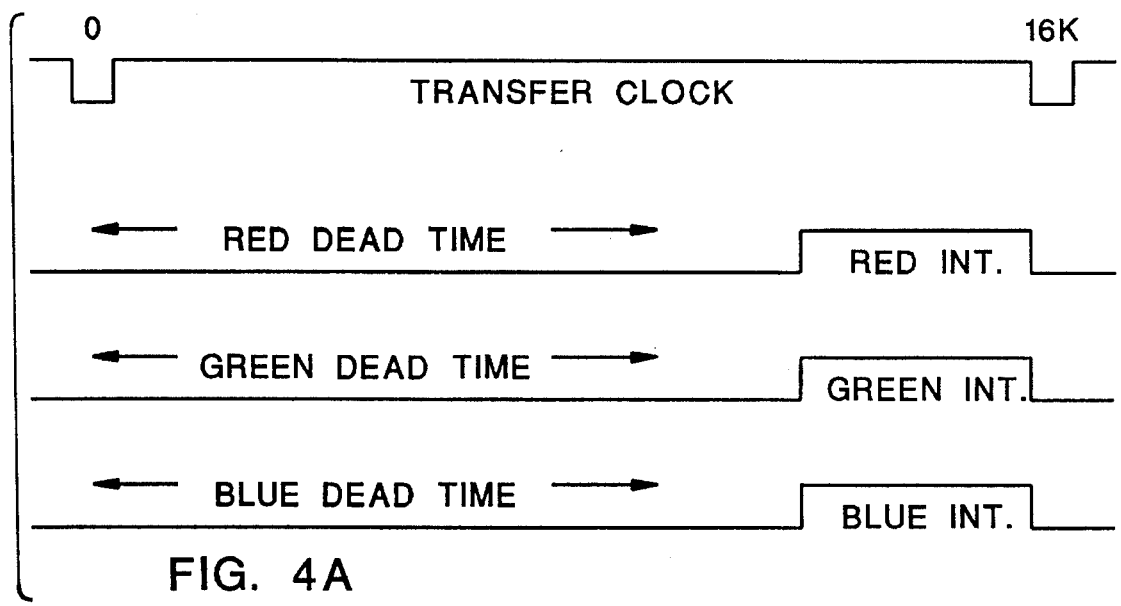
FIGS. 4A–4C depict a scanner calibration cycle.
Figure 4B:
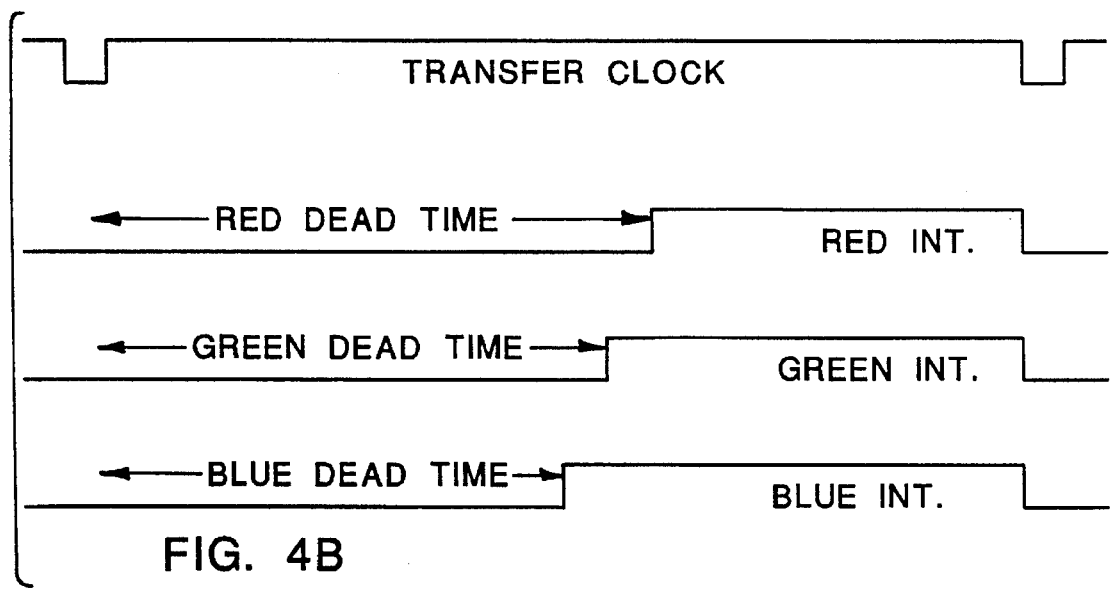
Figure 4C:
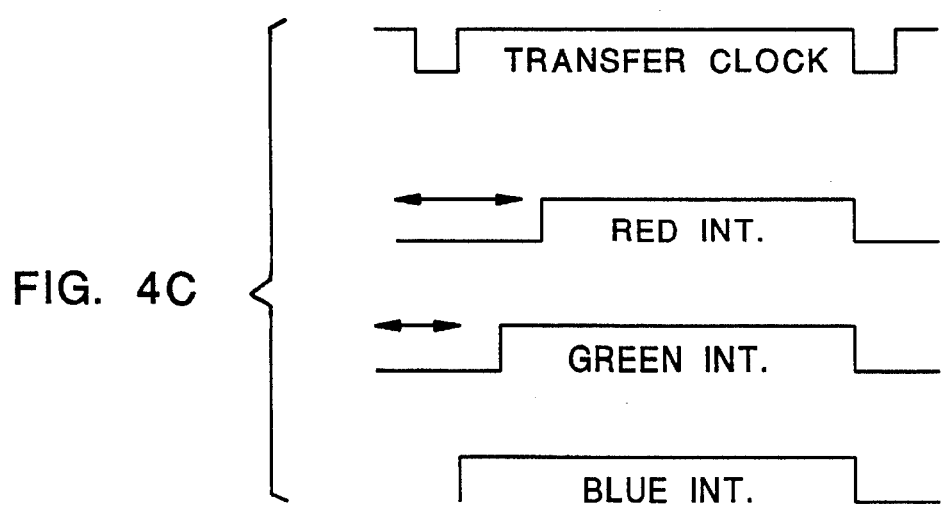

A graphic example of the dynamic adjustment of the clock signals in accordance with one embodiment of the present invention will be discussed with respect to FIGS. 4A–4C. For this example and the examples that follow, and for simplicity of understanding, it will be assumed that the D/A converters of the channels of the scanner will convert an analog exposure signal or value into a binary count of from 0 to 4000, that the binary value at which a pixel is considered to be the target predetermined percentage of saturation, and which is the target exposure value, is 3750 and that the pixel clock counter which counts pixel clocks for triggering the transfer and exposure clocks will count up to a maximum of 16000 (16K) pixel clocks. Note that these values can be set at different values depending on the actual resolution of the D/A converters used and the size of the count registers found in the particular scanner. At the start of the calibration the transfer clock period or line scan time can be set at some arbitrary time period which can be the maximum possible pixel clock count as illustrated in FIG. 4A or a line length which would provide sufficient integration time for the worst case scanner likely to be encountered by the method of the present invention. The dead time of the exposure clocks are set at some delay time, for example 12000 pixel clocks, which produces a minimum integration time for the sensors, for example 4000 pixel clocks as illustrated in FIG. 4A. A new line is started by initiating the transfer clock cycle which results in waiting until after the dead time period (12000 pixel clocks) has passed to clear the active pixels of the array 42 using the transfer gate 44 and to start charge accumulation for the integration time period (4000 pixel clocks). At the beginning of the next transfer clock cycle the accumulated charges are transferred to the shift register 48 and shifted out to the D/A converters. We will assume for this simplified example that the D/A values or signal levels produced are red=2000, green=1900 and blue=1800. The system determines new integration time (IT) periods by using the ratio of the current signal level (CL) to the signal level (CL) in accordance with: New IT=OS*Current IT*TL/CL. The parameter OS is designed to prevent overshooting of the target integration period and is generally less than 1.0. The calculation when OS=0.9 results in Red IT=6750, Green IT=7105 and Blue IT=7500. The dead time clock periods (DT) would be set to Red DT=9250, Green DT=8895 and Blue DT=8500 as illustrated in FIG. 4B. The measurement cycle is repeated, the integration periods again calculated using the above formula and the periods again adjusted. This iteration toward the obtaining the target value for the signal level for the slowest channel can continue for as many iterations as desired. However, it has been found that three to five iterations are sufficient to place the integration time for the slowest channel within a range of ±50 of the desired signal level value. Once the iteration cycle which determines the integration time periods is completed and the final integration time periods are determined, the integration time periods are compared and the transfer clock period is set at the longest integration time period which as illustrated in FIG. 4C is the blue channel integration time period. This also results in the dead time period for the channel with the longest integration period being set to zero which in this example results in the blue channel having an exposure clock period of 0 and the red and green channels each having a non-zero exposure clock period of about 1665 pixel clocks for the red channel and about 1000 pixel clocks for the green channel.

The example discussed above started with the transfer clock period set at the maximum based on the highest count of the pixel counter. It is possible, and preferable, to set the transfer clock period equal to the minimum integration period and expand the size of the transfer clock period coincident with the expansion of the integration periods. This involves setting the transfer clock period in the example discussed above to 4000 and then performing a signal level measurement and new integration time period calculation according to the formula mentioned above. The transfer clock period is set to be equal to the longest calculated integration time period and the dead times of the channels set accordingly. This cycle is repeated until the target signal level is reached and the transfer clock period is expanded to the minimum required.

In the examples discussed above the integration period for all the color channels is less than the maximum period (16K pixel clocks) countable by the pixel clock counter. If the integration time for one or more of the sensors is longer than this maximum period the clock frequency must be adjusted. For example, if on the first measurement cycle the blue current signal level is 750 then the blue integration time period calculated according to the above formula would be 18,000 pixel clocks which is greater than the maximum count (16K) of the counter. To solve this problem the clock frequency of the pixel clock, which is used to count the periods of all other clocks is divided down, preferably in factors of 2. In this example where the calculated integration time is 18000 the pixel clock is divided by two. If the calculated integration period is greater than 32K and less than 64K the pixel clock is divided by four and etc. for large integration periods. The calibration cycle can be started again after the clock frequency is adjusted or, preferably, the period values can be computationally adjusted and the iteration cycle allowed to proceed without interruption.

The radiometric dynamic range (sometimes called bit depth) of a film scanner is limited by the number of bits in the A/D converter and the signal to noise ratio in the analog electronics. It is sometimes desirable to trade off the ability to resolve the lower density image content of the film to more finely resolve higher density image content which would otherwise be lost. For example, negative film will have a spectrally dependent minimum density (Dmin) associated with it. This Dmin will be present on unexposed film and there is no useful image content associated with this minimum density. To maximize the signal to noise for all density readings, it is desirable to setup the scanner such that the maximum signal level is obtained at the film Dmin for each color channel. The dynamic integration time method of the present invention provides this ability either by calibrating the scanner with the film in the scanner or by an adjustment made after scanning is complete. The adjustment of the color independent exposures times described above can be performed with either zero or a known density film in the optical path. That is, the radiometric calibration (or precise exposure determination) for a film scanner in accordance with the present invention may be performed either with no film present or with film of a known density (Dmin) present. Once the integration time parameters are established for the known state (either with or without film present), the exposure time for each color channel can be modified, if necessary, such that the maximum signal level is obtained for each color channel under the desired film Dmin conditions. If a processed completely unexposed sample of the film is in the scanner at the time of calibration, the scanner is automatically adjusted to account for the absorption of the film at the spectrally dependent minimum density. If the film is not in the scanner during the calibration, the exposure values as well as the transfer clock, integration and exposure clock time periods must be adjusted accordingly. The adjustment value for each channel is determined in accordance with: Adjustment=$IT*10^{Dmin}$. For example, if the integration time periods (IT) of the above example are produced by a calibration with no film in the scanner and film with a Red Dmin of 0.2, a Green Dmin of 0.45 and a Blue Dmin of 0.57 is to be scanned, which is typical of negative film, the adjustments (additions) to the calculated integration time periods are Red Dmin Adjustment=158%, Green Dmin Adjustment=282% and Blue Dmin Adjustment=372%. The adjustment values are added to the integration time for each channel and then the operations for determining the transfer clock period and exposure chart period, as discussed above, are performed.

Figure 5:
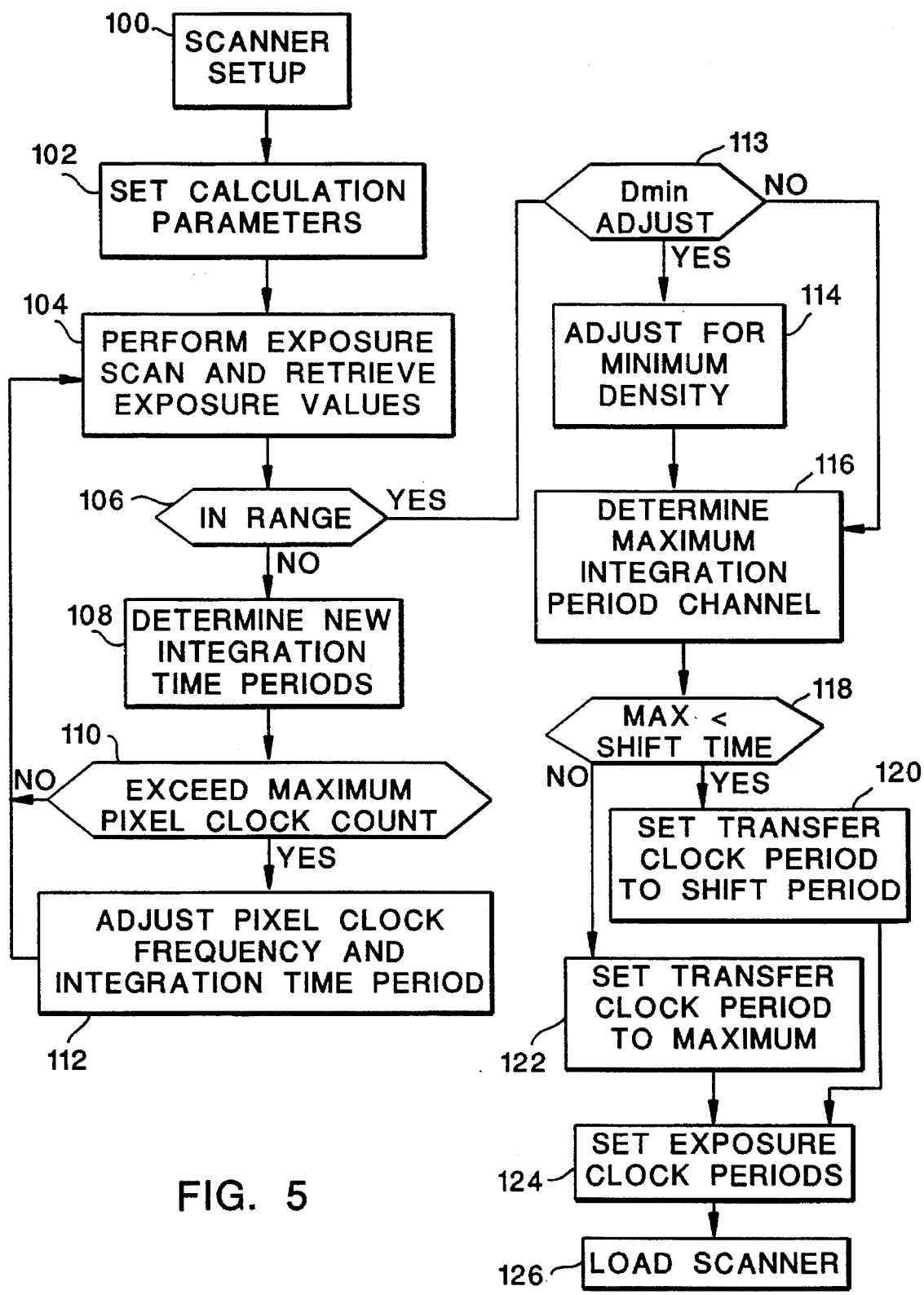
FIG. 5 is a flowchart of the calibration operation.

As will be discussed in more detail later with respect to the hardware configuration, the time period calculations discussed above are performed by a computer coupled to the scanner. The sequence of the operations is depicted in FIG. 5. The first step 100 is to prepare the scanner for the calibration. This involves mounting the appropriate film gate in the scanner, adjusting the magnification, adjusting the f-stop, etc. Once the set-up is complete, the calculation parameters for the particular scanner are set 102. This includes setting the minimum integration period and the initial transfer clock period, setting the maximum values for the number of pixel clocks that can be counted and the pixel clock frequency, setting the minimum number of pixel clocks necessary to shift out all the pixels as well as setting a range around the target exposure value, which when one of the actual exposure values falls within the range, the maximum integration time period will be considered found.

The next step 104 is to perform an exposure scan in which the light falling on the sensors is converted into digital signal levels or exposure values and these values are retrieved from the scanner. Next the exposure values are tested 106 against the range, for example plus or minus 50 of 3750. If at least one of the values is not in the range the target integration period based on the predetermined percentage of saturation has not been found and the new integration time periods are determined 108 using the formula previously discussed. The new integration time periods are then compared 110 to the maximum pixel clock count to determine whether the clock frequency needs to be adjusted. If one of the integration periods exceeds the maximum pixel clock count, the pixel clock frequency and the integration time periods are adjusted 112, by a factor of 2, until the integration period is within the maximum clock count range. The system then returns for another scan 104.

Once one of the exposure values is within the range of the target, the system, if necessary 113, makes 114 the adjustments necessary to account for some minimum density. The channel with the maximum integration time period is then determined 114. The maximum integration time period is then compared 118 to the minimum time required to shift all the charges out of shift register 48. If the maximum integration time is less than the shift-out time, the transfer clock period is set 120 to the shift-out time period. Otherwise the transfer clock period is adjusted 122 to the period of the maximum integration time period. The system then sets 124 the exposure start clock periods (dead time and integration time) for all channels where the dead time period for the slowest channel is set to zero. Once the transfer clock and exposure clock periods as well as the adjusted pixel clock frequency are determined, these values are loaded 126 into the scanner and the operator is signalled that calibration is complete. When finished, the process of FIG. 5 produces the optimum pixel clock frequency, the total number of pixels clocked needed to scan a line, such that the time interval between successive transfer clocks is equal to the maximum required color channel integration time, and the delay time in pixel clocks required for starting the integration of the faster channels relative to the transfer clock.

Figure 6:
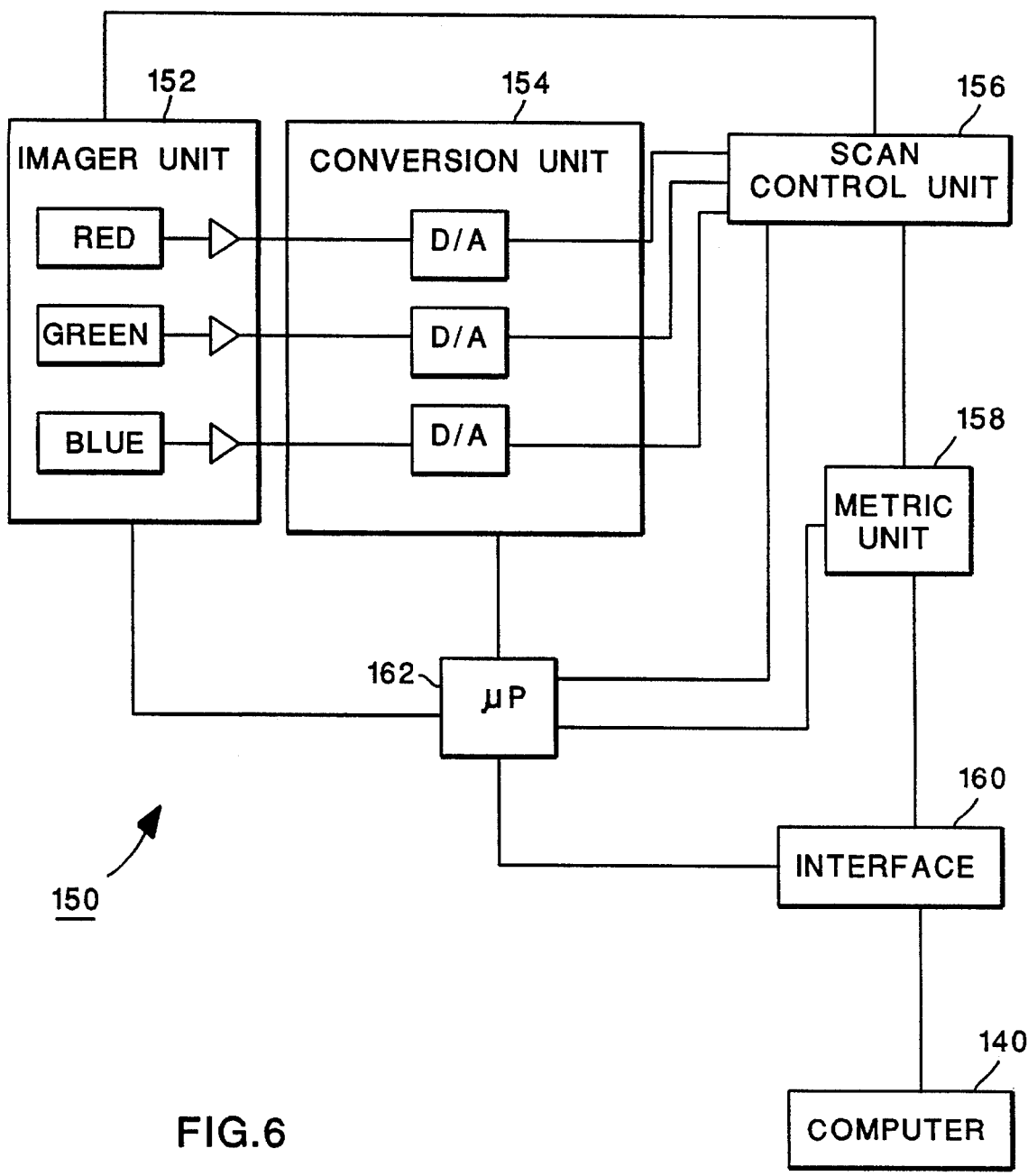
FIG. 6 is a block diagram of the scanner 150 coupled to the computer 140 which performs the operations of FIG. 5.

As previously mentioned the time period calculation and frequency adjustment operations of FIG. 5 are performed by a computer 140, such as a Sun Spark 2 Workstation available from Sun Microsystems, which is coupled to the scanner 150 as illustrated in FIG. 6. The scanner 150, which is typified by the Kodak unit previously mentioned, includes an imager unit 152 which includes three color channels with sensors such as shown in FIG. 3. The unit 152 is coupled to a conversion unit 154 which converts the analog light signals to digital exposure signals or values. These digital values are passed through a scan control unit 156 which controls the scanning according to the periods and frequency determined during the calibration. The scan control unit 156 also performs other functions not particularly relevant to the present invention, such as pixel summing and pixel gain corrections. The exposure values are converted into the color measurement metric designed for the scanner, such as status M density or preferably Photo YCC, by a metric unit 158. The color values or signals are then provided through an interface 160, such as an SCSI interface, to the computer 140. The scanner electro-mechanical functions are controlled by a microprocessor 162 which communicates with the computer 140 to receive the calculated period and frequency values and load them into circuits of the scan control unit 156. These circuits are depicted in FIG. 7.

Figure 7:
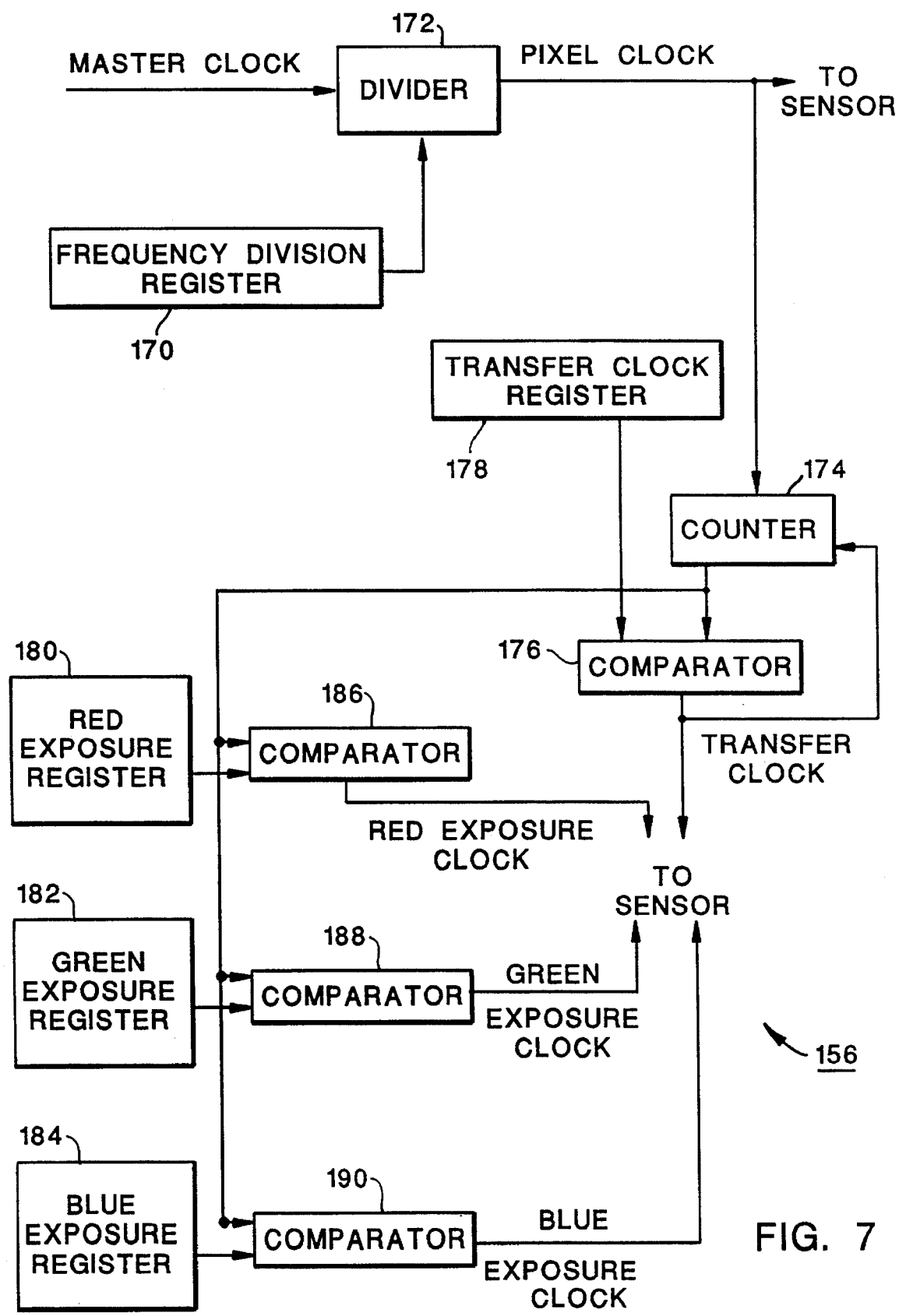
FIG. 7 depicts the control circuits for controlling the clock periods and frequency.

As illustrated in FIG. 7 the scan control unit 156 includes a register 170 which stores the frequency divisor value calculated by the computer 140. The frequency divisor value is used by a divider 172 to divide the master clock to produce the pixel clock. The pixel clock is counted by a counter 174 and compared by a comparator 176 to the count for the transfer clock period stored in register 178. In a similar manner the count of counter 174 is compared to exposure clock start or dead time period values stored in the red 180, green 182 and blue 184 registers by corresponding comparators 186, 188 and 190 to produce the exposure start clocks.

The present invention has been described with respect to performing the calculations for the clock periods and pixel clock frequency in a computer separate from the scanner, of course the calculations can be performed by the microprocessor 162 of the scanner. When the microprocessor 162 is sufficiently fast and has sufficient memory available for storing the procedures, such as preferred since the computer 140 would then not be necessary.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and

REFERENCE NUMBER LIST

10 Scanner
12 Film
14 Optics
16 Lens
18 Detector
20 Electronics
21 Lamp
22 Filters
24 Integrator
26 Condensor
40 Sensor
42 Photodiode array
44 Transfer gate
46 Transfer gate
48 Register
100–126 Flowchart steps
140 Computer
150 Scanner
152 Imager Unit
154 Conversion Unit
156 Scan control unit
158 Metric unit
160 Interface
162 Microprocessor
170,180,182,184 Register
172 Divider
174 Counter
176,186,188,190 Comparator

What is claimed is:

1. A method of calibrating line scan time of a multiple channel scanner, comprising:

determining integration time periods simultaneously for all channels of the scanner; and setting a line scan period of each of the channels to a maximum of the integration time periods.

2. A method as recited in claim 1, including determining the integration time periods using a sample of film to be scanned.

3. A method of calibrating line scan time of a multiple channel scanner, comprising:

determining integration time periods for channels of the scanner;

setting a line scan period of each channel to a maximum of the integration time periods; and setting a pixel clock frequency relative to the integration time periods when at least one of the integration time periods exceeds a predetermined time period countable by the scanner counting pixel clocks.

4. A method of calibrating exposure time periods of a multiple color scanner, comprising:

determining integration time periods for color channels of the scanner;

setting a line scan period of each channel to a maximum of the integration time periods; and setting an exposure start time for each of the color channels relative to the start of the line scan period responsive to the integration periods.

5. A method of calibrating exposure time periods with a minimum density offset of a multiple color scanner, comprising:

determining integration time periods for color channels of the scanner;

adjusting the integration time periods responsive to a spectrally dependent minimum film density of film to be scanned;

setting a line scan period of each channel to a maximum of the adjusted integration time periods; and setting an exposure start time for each of the color channels relative to the start of the line scan period responsive to the adjusted integration time periods.

6. A method of calibrating a multiple color film scanner, comprising:

determining integration time periods for color channels of the scanner;

adjusting a scanner clock frequency when one of integration time periods exceeds a predetermined value;

adjusting the integration time periods responsive to a minimum film density of film to be scanned;

setting a line scan period to a maximum of the integration periods when the maximum is less than a charge shift-out period;

setting the line scan period to the shiftout period when the maximum is equal or greater than the shift-out period; and setting exposure start time for each of the color channels relative to the start of the line scan period responsive to the integration periods.

7. A scanner system, comprising:

light sensors receiving light during scanning;

a scan control unit coupled to the light sensors and controlling line scan time of the sensors during scanning and integration start times of the sensors; and a computer coupled to the scan control unit, determining the integration times of the sensors, setting the line scan time responsive to a maximum of the integration times and setting the integration start times relative to the line scan time responsive to the integration times.

8. A system as recited in claim 7, wherein said sensors comprise three different color light sensors.

* * * * *